US006418519B1

(12) United States Patent
Cadden et al.

(10) Patent No.: US 6,418,519 B1
(45) Date of Patent: *Jul. 9, 2002

(54) MULTI-VOLUME, WRITE-BEHIND DATA STORAGE IN A DISTRIBUTED PROCESSING SYSTEM

(75) Inventors: William S. Cadden, Saugerties; Rong S. Lee, Staatsburg, both of NY (US); Oystein Skudal, Stavanger (NO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,413

(22) Filed: Nov. 28, 2000

Related U.S. Application Data

(63) Continuation of application No. 09/135,664, filed on Aug. 18, 1998, now Pat. No. 6,216,209.

(51) Int. Cl.[7] .............................................. G06F 12/00
(52) U.S. Cl. ...................................... 711/154; 711/111
(58) Field of Search ................................. 711/148, 154, 711/156, 111, 112, 170; 707/205; 709/212, 214, 216, 203

(56) References Cited

U.S. PATENT DOCUMENTS

| 4,878,166 A | 10/1989 | Johnson et al. |
| 4,947,366 A | 8/1990 | Johnson |
| 5,438,674 A | 8/1995 | Keele et al. |

(List continued on next page.)

FOREIGN PATENT DOCUMENTS

| JP | 8-17006 | 1/1996 |
| JP | 08123729 | * 5/1996 |

OTHER PUBLICATIONS

IBM publication "IBM Network Tape Access and Control System for AIX and IBM NetTAPE Tape Library Connection User's Guide and Reference", Release 1.1, Fourth Edition (Aug., 1996), Sections: "ctpalloc or tpalloc–Allocating a tape device" (6 pp.); "ctpclose or tpclose–Closing the Tape File" (1 p.); "ctpopen–tpopeu–Opening the tape file" (6 pp.); and "ctpwrite or tpwrite–Writing to Tape" (1 p.), (htp://www.rs6000.ibm.com/resource/aix_books/nettape/index.html).

(List continued on next page.)

Primary Examiner—Matthew Kim
Assistant Examiner—Matthew D. Anderson
(74) Attorney, Agent, or Firm—Lawrence D. Cutter, Esq.; Kevin P. Radigan, Esq.; Heslin Rothenberg Farley & Mesiti P.C.

(57) ABSTRACT

A write-behind computer program product is presented which allows writing data to multiple volumes of storage media associated with one or more server nodes in a distributed processing environment. A client application on a client node writes blocks of data to a first magnetic tape of a first server node until an end of physical storage of the first magnetic tape is reached, without having predetermined the size of the first magnetic storage. Thereafter, the writing of blocks of data is switched to a second magnetic tape, which may be on the first server node or a second server node in the system. The writing and switching process can repeat a number of times across multiple magnetic tapes. Data is written in a write-behind operation and the switching to a new magnetic tape occurs transparent to the client application, and without loss of data. The client and server nodes are adapted to ascertain how many blocks of data were written to the first storage medium, and the second storage medium, and to allow for the client process to write a header label to the second storage medium prior to writing blocks of data thereto.

18 Claims, 11 Drawing Sheets

U.S. PATENT DOCUMENTS

| | | | |
|---|---|---|---|
| 5,455,926 | A | 10/1995 | Keele et al. |
| 5,526,507 | A | 6/1996 | Hill |
| 5,608,901 | A | 3/1997 | Letwin |
| 5,611,049 | A | 3/1997 | Pitts |
| 5,892,914 | A | 4/1999 | Pitts |
| 6,216,209 | B1 * | 4/2001 | Cadden et al. ............... 711/154 |
| 6,237,068 | B1 * | 5/2001 | Cadden et al. ............... 711/154 |

OTHER PUBLICATIONS

IBM publication "IBM Network Tape Access and Control System for AIX and IBM NetTAPE Tape Library Connection User's Guide and Reference", Release 1.2, Sixth Edition (Jan., 1998), pp. 168–175; 177–178; 180–187; 193; 196.

* cited by examiner

MULTI-VOLUME, WRITE-BEHIND DATA STORAGE IN A DISTRIBUTED PROCESSING SYSTEM

CROSS-REFERENCE TO RELATED APPLICATIONS

This application is a continuation of co-pending U.S. Pat. application Ser. No. 09/135,664, filed Aug. 18, 1998, now U.S. Pat. No. 6,216,209, entitled "MULTI-VOLUME, WRITE-BEHIND DATA STORAGE IN A DISTRIBUTED PROCESSING SYSTEM," the entirety of which is hereby incorporated herein by reference. Further, this application contains subject matter which is related to the subject matter of the following applications, each of which is assigned to the same assignee as this application. Each of the below-listed applications is hereby incorporated herein by reference in its entirety:

"METHOD FOR MULTI-VOLUME, WRITE-BEHIND DATA STORAGE IN A DISTRIBUTED PROCESSING SYSTEM," by Cadden et al., Ser. No. 09/136,052.

"SYSTEM FOR MULTI-VOLUME, WRITE-BEHIND DATA STORAGE IN A DISTRIBUTED PROCESSING SYSTEM," by Cadden et al., Ser. No. 09/136,149; and

TECHNICAL FIELD

The present invention relates to mass storage of computer systems. More-particularly, the invention relates to a write-behind enablement process which allows writing of data to multiple volumes of storage media associated with one or more server nodes in a distributed processing environment.

BACKGROUND OF THE INVENTION

In a distributed client/server storage environment, a client process will send data for storage to a remote server node, which writes the data to the actual storage medium. The ability to write data to remote storage medium allows an application program to use hardware that is associated with processors other than the one the application program is running on. The sharing of hardware resources in this way is a main advantage of a distributed computing environment. In order to improve performance within such an environment, it is desirable that the client program write several blocks of data to the server node for storage before reading a response-from the server node to see if the transferred blocks of data have been written correctly. This technique of writing to the server node multiple blocks of data before confirming at a predetermined interval that the data has been correctly written is referred to as a "write-behind" function. With this function, communication overhead and delays between the client and server are minimized.

One difficulty with the write-behind process occurs because the client node does not continually check for status after sending each block of data. It will not be notified that the storage medium is full until the predetermined number of blocks have been sent to the server. Thus, the client node may only be notified of an end of volume condition after it has sent several additional blocks of data following the first block of data that would not fit in the storage medium.

One way that previous products have handled this problem is to require the client program to know the size of the storage medium before writing to it. As the client writes blocks of data to the storage medium, it knows that after a pre-specified number of blocks it must stop writing, and transition to a new storage medium. By doing this, the client never sends extra blocks to the server that cannot be written to the existing medium, and the problem is avoided.

There are two penalties for requiring the client to know the size of the storage media ahead of time. The first is that it is inconvenient to the programmer who must specify the storage medium size. The second is that in order to be safe, the maximum number of blocks is often not written to the storage medium. Thus, part of each storage medium may go unused.

In view of the above, a different approach to data transfer interfacing of the client and server nodes is desired.

DISCLOSURE OF THE INVENTION

Briefly summarized, in a first aspect the present invention comprises an article of manufacture which includes at least one computer usable medium having computer readable program code means embodied therein for storing data in a distributed processing system having multiple processors. One processor of the system is designated a client node and one or more other processors are designated server nodes. Each server node has at least one storage medium associated therewith. The computer readable program code means in the article of manufacture includes computer readable program code means for causing a computer to: (i) write blocks of data from a client process of the client node to a first storage medium of a first server node, the writing continuing until all blocks of data to be stored by the client process are written to the first storage medium or a physical end of storage is reached for the first storage medium, wherein the physical end of storage is reached without size of the first storage medium having been predetermined; (ii) switch writing blocks of data from the client node to a second storage medium of a second server node if the physical end of storage is reached for the first storage medium, wherein the switching writing is transparent to the client process; and (iii) adapt the writing of blocks of data from the client process of the client node to the first storage medium and to the second storage medium so that the writing comprises a write-behind operation, with the first server node and the second server node periodically notifying the client node whether previously received blocks of data have been correctly written to the first storage medium or the second storage medium, respectively.

In another aspect, the invention comprises an article of manufacture which includes at least one computer usable medium having computer readable program code means embodied therein for storing data in a distributed processing system having multiple processors. One processor of the system comprises a client node and one or more other processors comprise server nodes. Each server node has at least one storage medium associated therewith. The computer readable program code means in the article of manufacture includes computer readable program code means for causing a computer to: (i) write blocks of data from a client process of the client node to a first storage medium of the at least one storage medium associated with the first server node, the writing continuing until a physical end of the first storage medium is reached, wherein the physical end of the first storage medium is reached without having predetermined a size of the first storage medium; (ii) switch the writing of blocks of data to a second storage medium after the physical end of the first storage medium is reached, the second storage medium comprising a storage medium of the first server node or a storage medium of a second server node of the distributed processing system; (iii) adapt the writing of blocks of data to the first storage medium to comprise a write-behind operation wherein the first server node periodically notifies the client node whether previously received blocks of data have been written correctly to the first storage medium; and (iv) ascertain for the client process of the client node how many blocks of data were written to the first storage medium.

In a still further aspect, an article of manufacture is provided which includes at least one computer usable medium having computer readable program code means embodied therein for storing data in a distributed processing system having multiple processors. One processor of the system is designated a client node and one or more other processors comprise server nodes. Each server node has at least one storage medium associated therewith. The computer readable program code means in the article of manufacture includes computer readable program code means for causing a computer to: (i) write blocks of data from a client process of the client node to a first storage medium associated with a first server node of the distributed processing system, the writing continuing until a physical end of the first storage medium is reached, wherein the physical end of the first storage medium is reached without having predetermined a size of available storage in the first storage medium; (ii) write a header label to a second storage medium when the physical end of the first storage medium is reached, the second storage medium comprising a storage medium associated with the first server node or a storage medium associated with a second server node of the distributed processing system; (iii) switch the writing of blocks of data to the second storage medium when the physical end of the first storage medium is reached, wherein the header label precedes the writing of blocks of data to the second storage medium; and (iv) adapt the writing of blocks of data to the first storage medium so that the writing comprises a write-behind operation with the first server node periodically notifying the client node whether previously received blocks of data have been written correctly to the first storage medium.

The concepts presented herein produce numerous advantages over conventional client/server interfacing for a write-behind process in a distributed processing environment. First, enhanced flexibility is provided by allowing the client application to store blocks of data to storage media associated with different processors within the distributed environment. Thus, a client application may switch writing blocks of data from a first tape mounted on a first drive on a first processor to a second tape mounted on a second drive of a second processor in the distributed processing system. Further, with an application programming interface as described herein, it is possible for client programs to track exactly how many blocks of data have been written to each storage medium so that future access to a specific block of data on a specific storage medium is possible. Advantageously, enhanced flexibility is provided herein to the client application for the client program to write its own headers. The multi-volume data transfer process disclosed herein allows a client process to use the full capacity of the storage medium in a multiple tape volume backup without requiring prior knowledge on the size of each tape when writing the blocks of data. Thus, the present invention provides better storage performance within a distributed tape environment.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
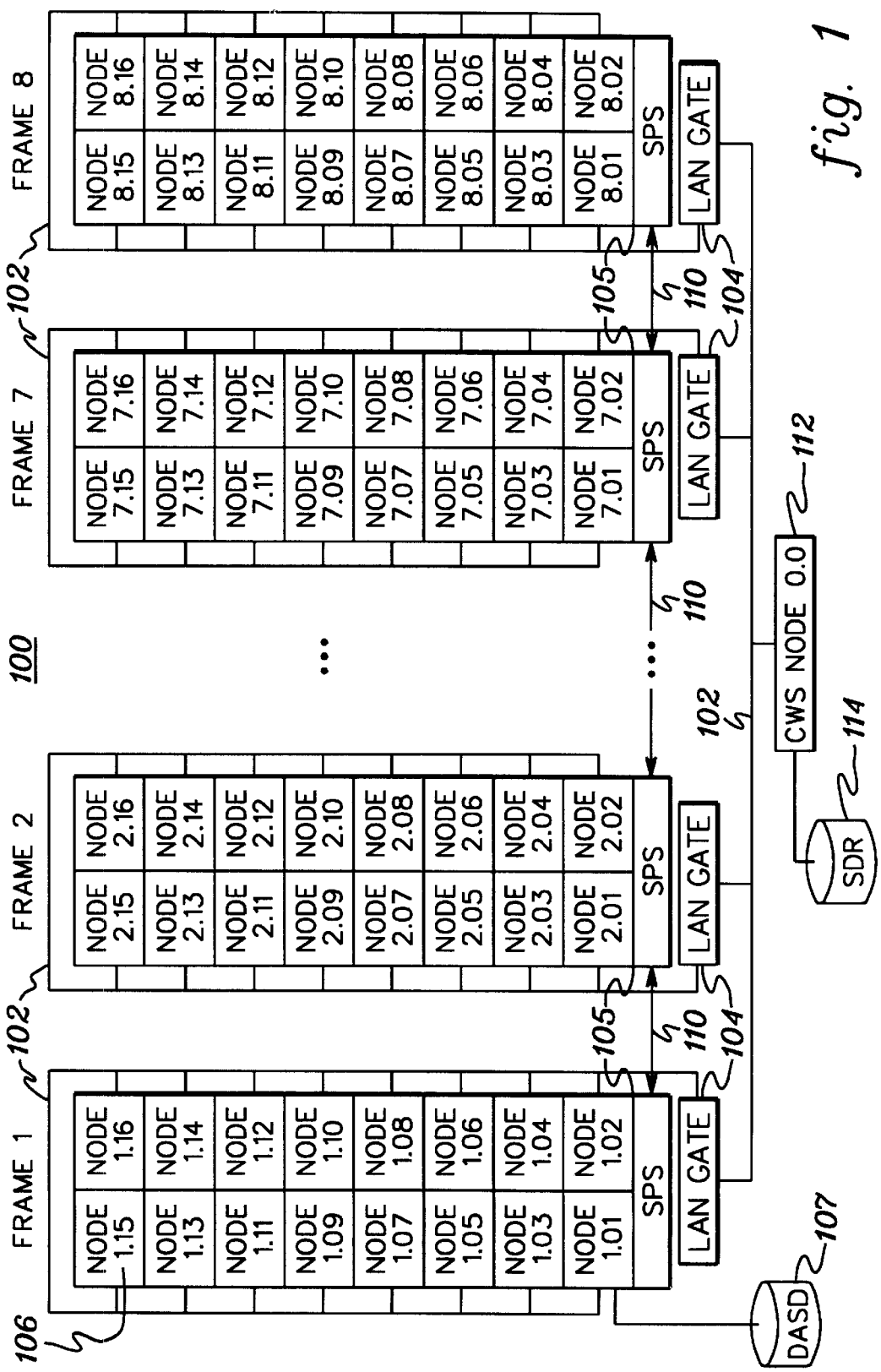
FIG. 1 is a schematic diagram of a distributed data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, New York. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one to another of the nodes 106 by means of the high performance switches 105.

Figure 2:
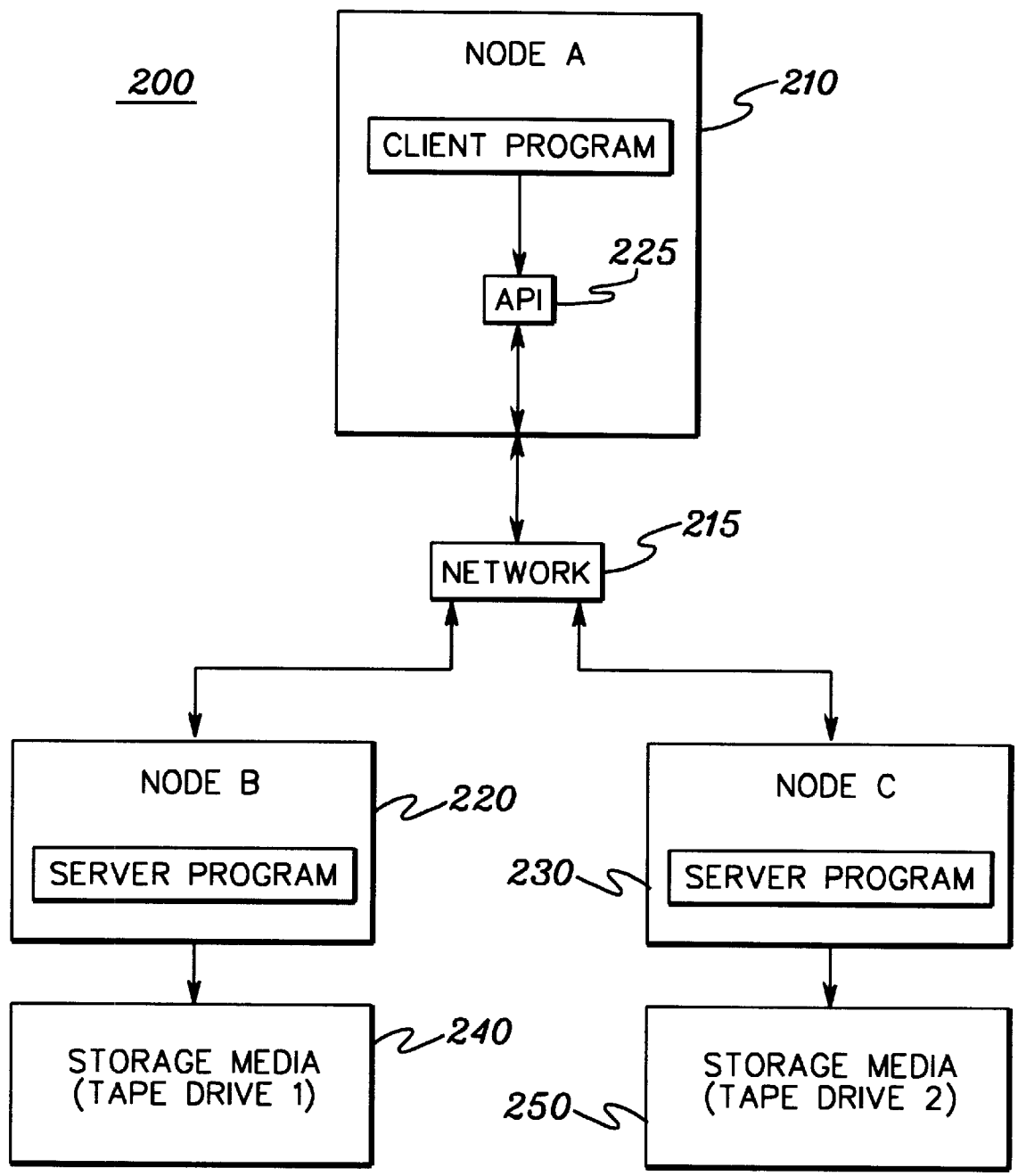
FIG. 2 is a simplified block diagram of a distributed processing system incorporating data storage concepts in accordance with the present invention.

FIG. 2 depicts a simplified diagram of a distributed computer system 200 usable with the present invention. System 200 includes multiple processors, each of which may comprise an IBM RISC System/6000 Scalable POWERparallel Systems (SP) as referenced above in connection with FIG. 1. In this example, one processor comprises a client node 210 (node A), and two other processors comprise server nodes 220 & 230 (nodes B & C). Node A 210 communicates with node B 220 and node C 230 across a network 215 as described above. A client program runs on client node 210. The client program, which is also referred to as the client process, client application or user application, employs an application programming interface (API) 225 for writing blocks of data into storage media 240 associated with server node B 220 and/or storage media 250 associated with server node C 230.

Each storage media 240 & 250 may comprise one or more storage medium. Examples of storage medium or devices usable with this invention include magnetic-tape units, direct-access storage devices (DASD), optical disks, printers, teleprocessing devices, communication controllers and sensor-based equipment, including optical devices. A preferred embodiment of the invention is described herein in relation to a particular storage device, i.e., magnetic-tape storage; however, it will be apparent to one of ordinary skill in the art that the invention is also applicable to the other storage devices noted. In the embodiment shown, storage media 240 includes a first tape drive and storage media 250 includes a second tape drive.

As briefly noted above, the present invention is directed to handling multiple volume tape data transfers in a distributed environment such as depicted in FIGS. 1 & 2, where a "write-behind" process is employed to write the storage volumes. Numerous difficulties with implementing this process are first identified below, then solved pursuant to the present invention.

Continuing to reference FIG. 2, the client program within client node A sends blocks of data for storage to a remote tape server, e.g., the server program of server node B 220. The tape server then writes the actual tape, i.e., storage media 240, with the blocks of data. In order to improve performance, it is desirable that the client program write several blocks to the server before reading a response from the server to see if the blocks have been written correctly. As noted, the technique is referred to in the art as "write-behind" processing.

Figure 3:
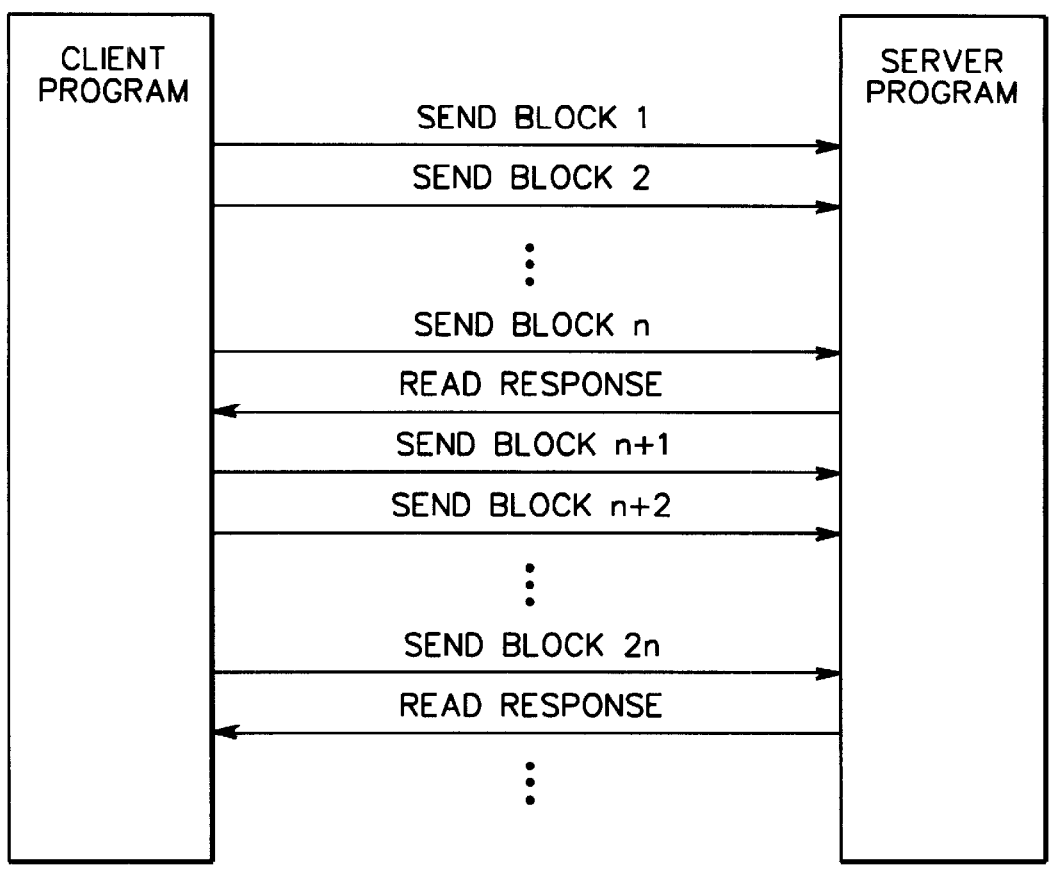
FIG. 3 is a diagram of "write-behind" data transfers between a client program on a client node and a server program on a server node in the distributed system of FIG. 2, wherein the server program confirms to the client program the correct writing of blocks of data to the storage medium every n data blocks.

FIG. 3 depicts an example of the data transfers between the client program and the server program in a properly operating write-behind process. Multiple blocks of data (block 1 . . . block n) are forwarded from the client program to the server program, which periodically-responds with a read response back to the client program. The first read response comprises an indication of whether block 1 . . . block n of data have been correctly written to the tape. Assuming that the blocks of data have been correctly written, the process continues with the next n blocks of data (blocks n+1 . . . 2n), after which a next read response is returned from the server program to the client program.

In a multi-volume storage implementation, when a tape becomes full, the server program must recognize the end of tape condition and respond to the client program by indicating that one or more received blocks of data could not be written. In one example, the client program must then tell the server program to mount a new tape (i.e., initiate a new storage medium), after which the client program must resend the blocks of data that could not be written to the server program for writing to the new tape, along with any remaining blocks of data. This process must be repeated each time a tape becomes full. Conventionally, loss of blocks of data has been avoided in a multi-volume implementation by predetermining the size of the tape and terminating transfer of data from the client node to the server node commensurate with reaching the end of tape.

Figure 4:
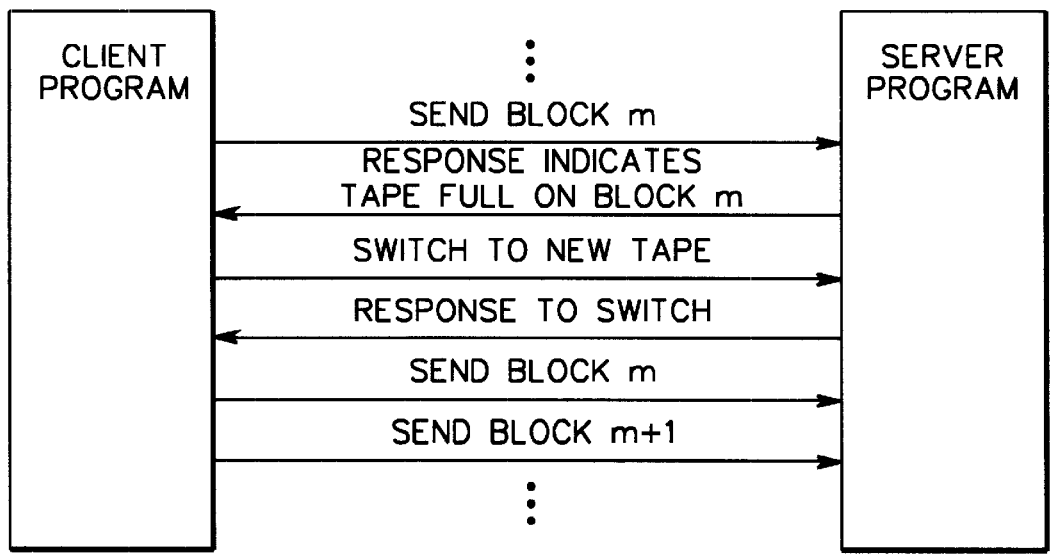
FIG. 4 is diagram of data transfers occurring when a physical end of the storage medium receiving the blocks of data is reached and confirmation of correct writing of each block of data has been sent from the server to the client.

FIG. 4 presents a diagram of an ideal end of tape process. After sending block m, the server program responds to the client program by indicating that the storage tape is full either prior to or partially through block m. The client program instructs the server program to switch to a new tape, i.e., assuming multiple storage tapes are available at the designated server node. The server program returns a response to the client program confirming the switch to the new tape and the block of data m is re-transmitted along with any remaining blocks of data m+1 . . .

Figure 5:
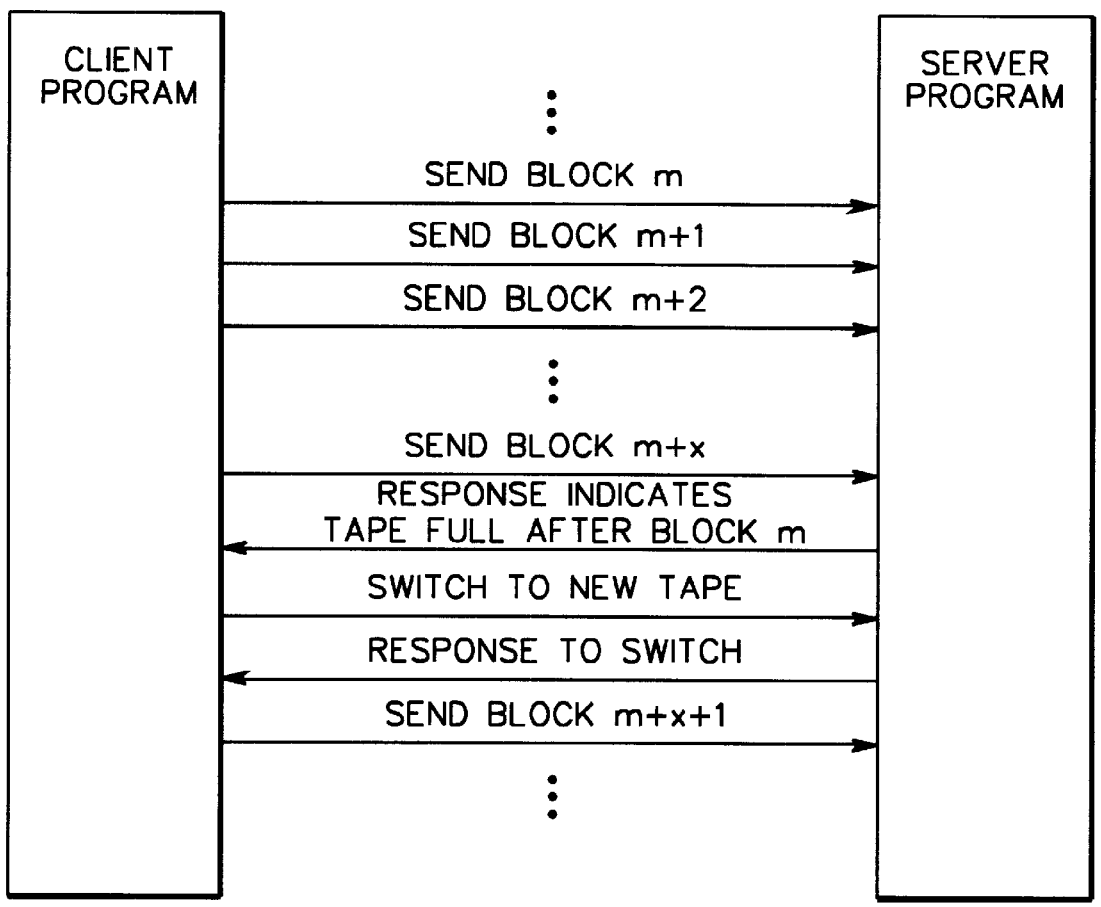
FIG. 5 is a diagram of "write-behind" data transfers occurring between the client program and the server program, with an end of physical storage medium being reached after writing data block m.

A first difficulty appears in a write-behind operation because the client program does not check for status after sending each block of data. Thus, the client program may not be notified of the end of tape condition until it has sent several blocks of data after a first data block that would not fit on the current tape storage. FIG. 5 presents an example of this problem. Blocks m through m+1 are forwarded from the client program to the server program for storage. At some subsequent point in time, the server program responds to the client program by indicating that the tape reached full upon receipt of block m. The client program sends a command to the server program to switch to a new tape, and the server program responds with a response confirming the switch to the new tape. Thereafter, the client program continues to send data beginning with block of data m+x+1. However, blocks of data m+1 . . . m+x would have been lost in this case and the resulting multi-volume tape would be missing data.

A second difficulty, related to the first problem, is that the client program may need to know exactly how many blocks of data have been written to each storage medium or volume. Certain applications rely on this information to access specific blocks of data from multiple volume data sets. If the client node knows how many blocks of data were written to each tape, then the applications running thereon can read a specific block of data quickly by loading only the volume that contains the block of data to be read. Using the "write-behind" process makes it more difficult for the client program to know exactly how many blocks of data have been written to each volume, i.e., assuming that each volume size has not been predetermined prior to writing the blocks of data.

Figure 6:
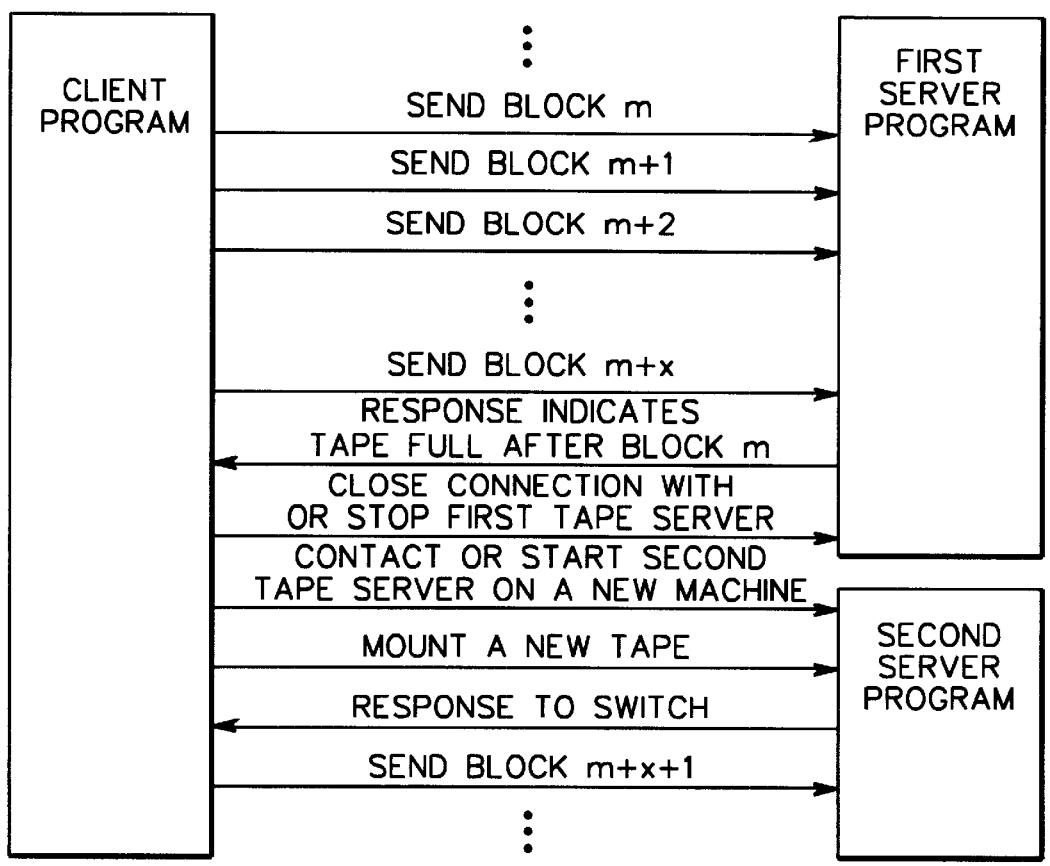
FIG. 6 is a diagram of "write-behind" data transfers occurring between the client program and server program, showing a switch in writing from a first storage medium on a first server node to a second storage medium on a second server node.

A third problem is identified when it is considered that the second tape may be associated with a different tape drive, and that tape drive may reside on a different machine or server node than the first tape drive (see FIG. 2). In this case, a new server program must be contacted or started on the new node, and all blocks of data that could not be written to the first tape must be sent to the new node for writing on the second tape. FIG. 6 presents an example of the data transfer occurring in this scenario.

As shown in FIG. 6, blocks of data m . . . m+x are forwarded from the client program to a first server program. Thereafter, the first server program provides a response to the client program indicating that the first tape was full after receipt of block m. The client program then closes the connection or stops the first tape server and contacts or starts a second tape server on a new node. A new storage tape is mounted by the second server program and a response is sent from the second server program to the client program confirming switching writing of blocks of data to the second tape. Thereafter, blocks of data m+x+1 are forwarded from the client program to the second server program for writing to the second tape. The error in this example, obviously, is a loss of blocks of data m+1 . . . m+x. Correct handling of data requires that these blocks of data be transferred from the first server node (e.g., server node B of FIG. 2) to the second server node (e.g., server node C of FIG. 2).

Preferably, the solution to the first three problems identified above will be packaged in an application programming interface (API) so that multiple client applications can use common commands. The client programs call entry points, such as open, close, and write in order to write blocks of data to storage. This creates a fourth difficulty however. Certain client programs need to write customized header labels on the tapes commensurate with the storage of data.

Thus, when a logical end of tape condition is encountered, the client program will preferably be able to do the following:

1. Switch volumes;
2. Write header labels to the new volume;
3. Write the blocks that previously couldn't be written to the current volume to the new volume; and
4. Continue writing to the new tape from the point at which the logical end of the prior volume was encountered.

To summarize, the present invention is directed to handling multiple volume tape data transfers in a distributed environment where write-behind processing is employed. Four main difficulties in accomplishing this are identified:

1. The client program is not notified immediately when a tape is full, therefore, it may send several data blocks which cannot be stored on the receiving tape before the client program is notified of the end of tape condition;
2. The client program must be able to find out how many blocks of data have been written to each tape;
3. The next volume of a multi-volume file may need to be written on a different machine than the preceding volume; and
4. A program calling an API that handles the first three difficulties may want to write its own header label(s) to the next volume.

The solution presented herein addresses each of these problems. Note that the invention assumes that writing of blocks of data to the first tape is performed without any intelligence to predetermine the size of the storage medium and thereby anticipate termination of writing upon reaching end of tape. With the exception of label writing, the end of tape processing and data handling presented herein is preferably transparent to the client program.

Figure 7:
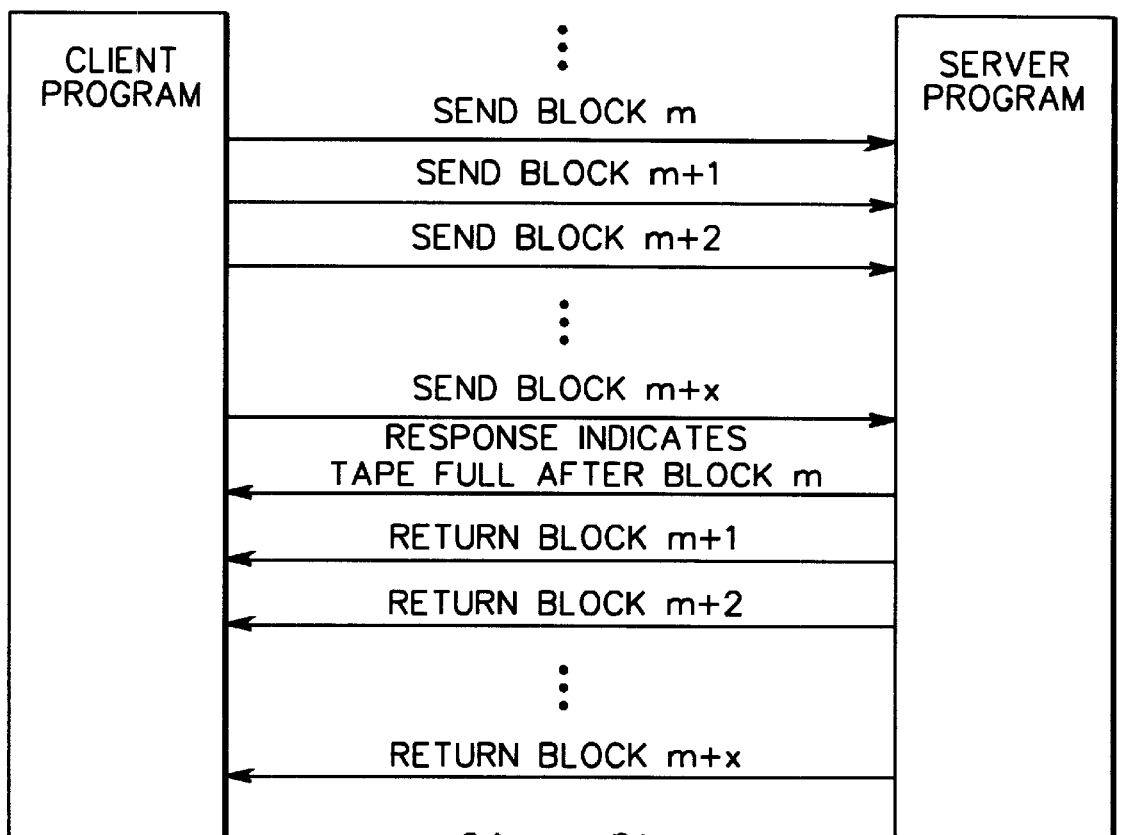
FIG. 7 is a diagram of "write-behind" data transfers occurring between the client program and the server program, wherein data blocks m+1 through m+x transferred from the client program to the server program are returned unwritten after the server has noted that the present storage medium is full.
Figure 8:
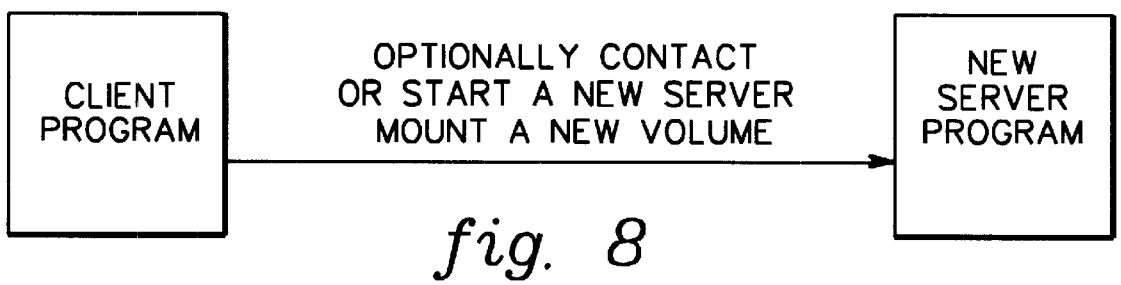
FIG. 8 is a diagram of a client program starting the new server to enable the switching of writing of blocks of Data from a full storage medium to a new storage medium associated with the new server.
Figure 9:
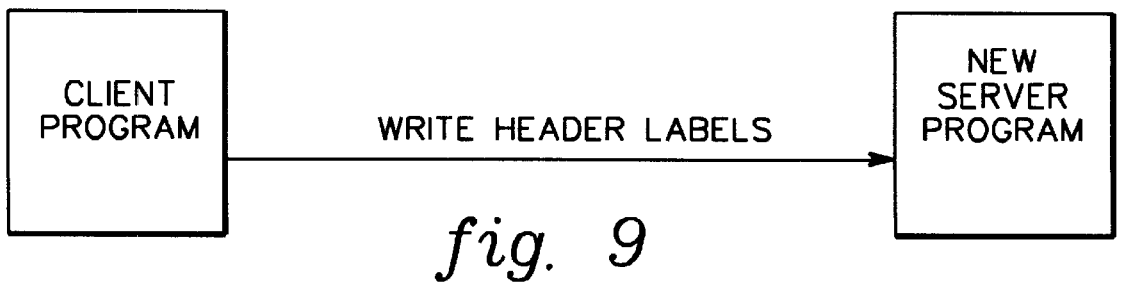
FIG. 9 is a diagram of the client program writing labels to the server program for storage prior to writing blocks of data to a storage medium in accordance with the present invention.
Figure 10:
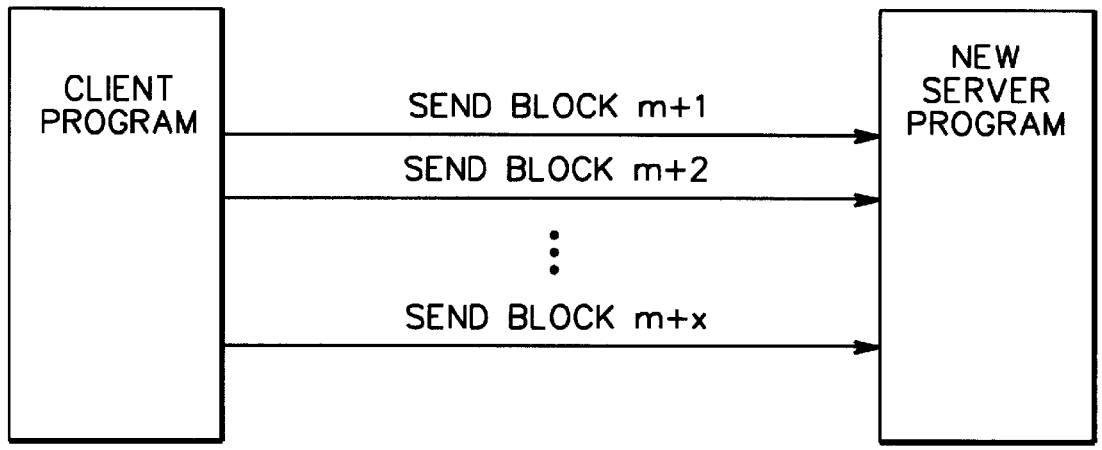
FIG. 10 is a diagram of "write-behind" data transfers occurring between a client program and a new server program for writing-previously returned data blocks to the new storage medium associated with the new server node in accordance with the present invention.
Figure 11:
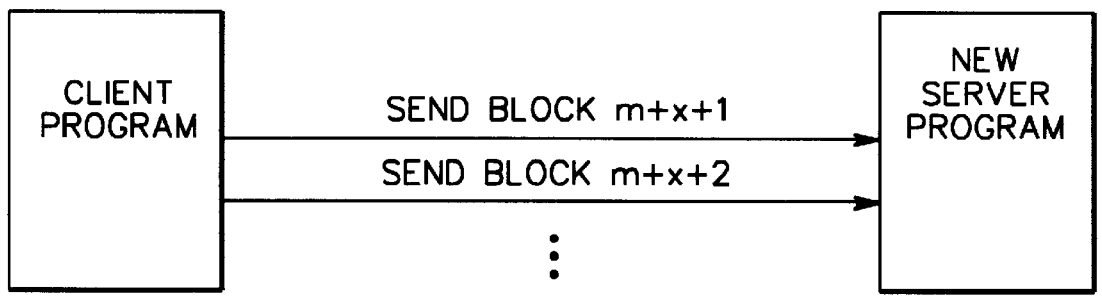
FIG. 11 is/a diagram of "write-behind" data transfers between the client and new server showing writing of data blocks m+x+1 . . . , after returned data blocks m+1 through m+x have been written by the client node to the new storage medium in accordance with the present invention.

One embodiment of a general process flow in accordance with the principles of the present invention is first outlined and then described in greater detail below. As an overview, processing in accordance with the present invention includes:

1. A client program calling a tape API open function (discussed below) to open a file;
2. The client program then calls a tape API write function (discussed below) to write blocks of data to the tape;
3. When the end of tape condition is detected at the server program, the server sets a flag to indicate that all blocks of data received from this point on should be sent back to the client program. This will cause the data transfer flow depicted in FIG. 7. The figure assumes that end of tape is reached after block m. Upon indicating to the client program that the tape is full after block m, the server program returns unwritten data blocks m+1 . . . m+x;
4. The tape API write call returns a value to the calling program that indicates an end of volume condition has occurred;
5. The client program receives the unwritten blocks that the server program returns to it and buffers them in a "write-behind buffer" so that the data blocks can be written to a next tape;
6. The calling program then calls the tape API close (discussed below) and open functions to switch to a new volume. If the new volume resides on another machine (i.e., a different processor or node), this will cause a new tape server to be contacted or started as depicted in FIG. 8;
7. If the calling program is writing its own header labels, then the calling program calls the tape API write function to write the header labels for the new tape as shown in FIG. 9;
8. The client program now calls the tape API "Flush-WriteBuffer" function (discussed below) to "flush" the unwritten data blocks in the write-behind buffer (that were received from the server program in step 4). As shown in FIG. 10, these "flushed" blocks of data (i.e., data blocks m+1 . m+x) are forwarded from the client program to, for example, the new server program; and 9. As shown in FIG. 11, data transfer continues as normal from this point forward until all blocks of data have been written to the new tape or an end of tape condition is reached at the new tape, after which the process outlined above would repeat.

Figure 12:
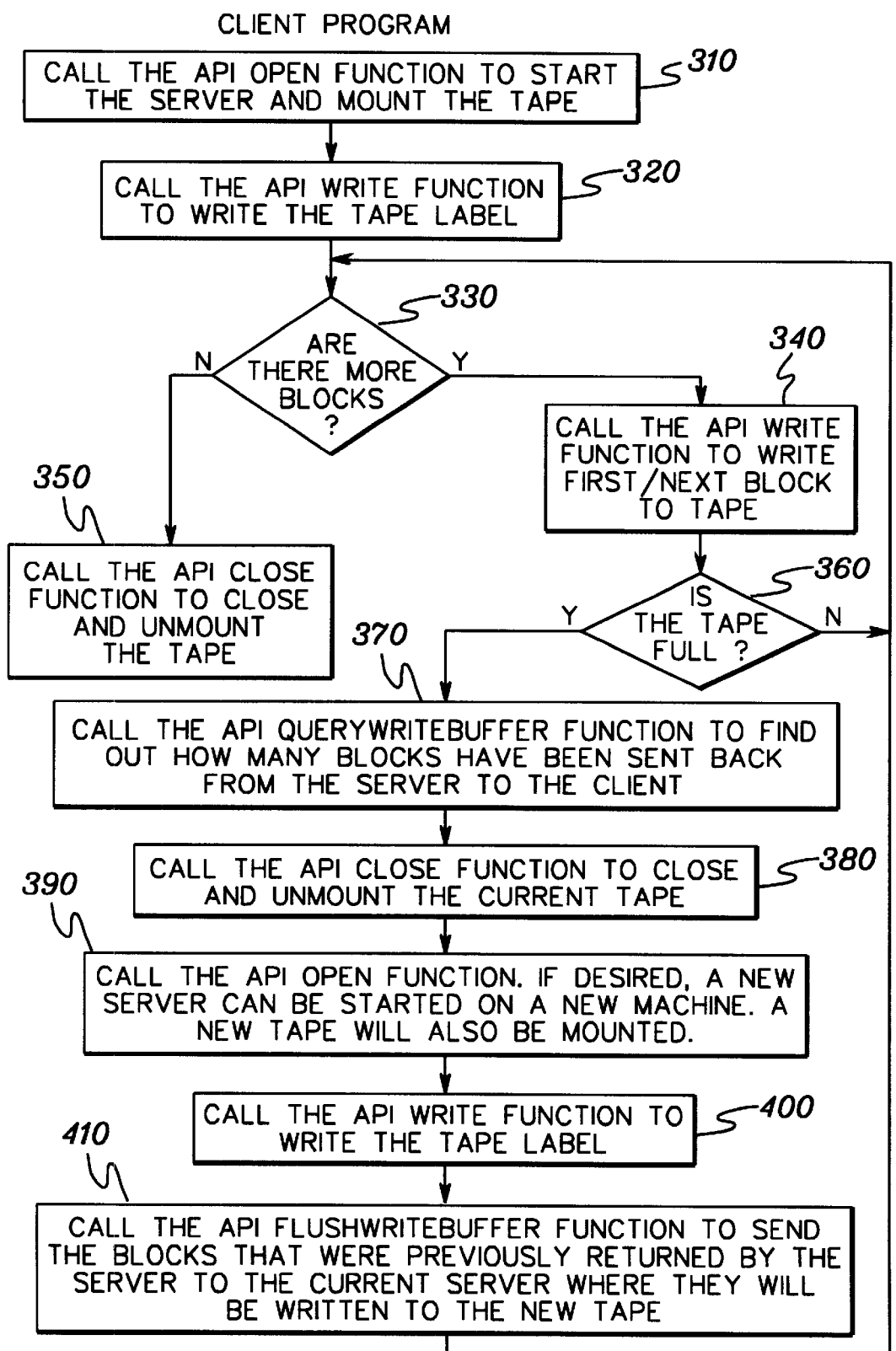
FIG. 12 is a flowchart of one embodiment of client processing for multi-volume, "write-behind" data transfers in accordance with the principles of the present invention.

FIG. 12 is a flowchart of one embodiment of client program processing in accordance with the principles of the present invention. Note that one embodiment for allocating a tape device, opening and closing a tape file and writing data to tape is available from an International Business Machines Corporation publication entitled "IBM Network Tape Access and Control System for AIX and IBM NetTape Tape Library Connections User's Guide and Reference", Release 1.1, Fourth Edition (August, 1996), and International Business Machines Corporation publication entitled "IBM Network Tape Access and Control System for AIX and IBM NetTape Tape Library Connections User's Guide and Reference", Release 1.2, Fifth Edition (August, 1997), the entirety of both of which are hereby incorporated herein by reference.

Figure 13:
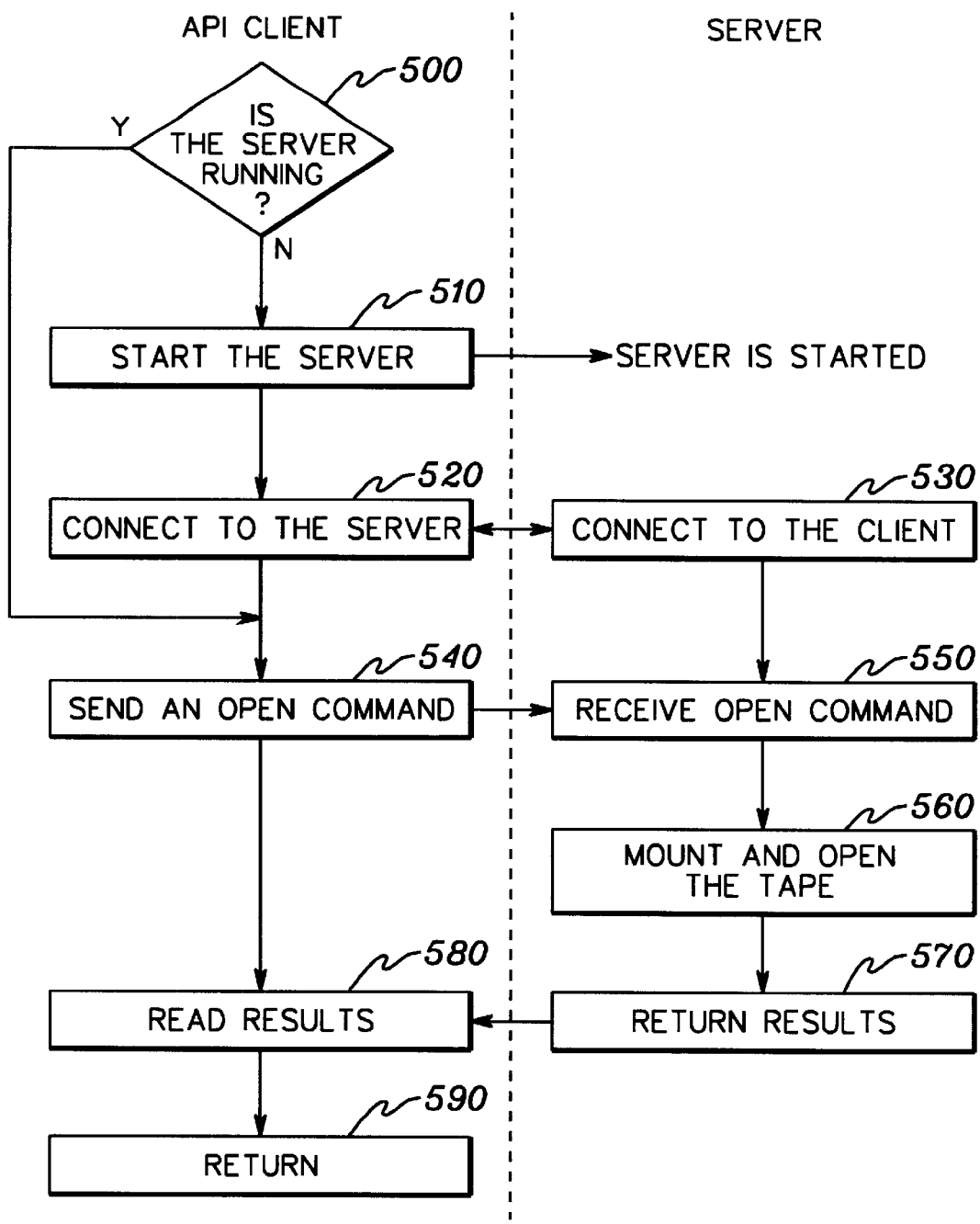
FIG. 13 is a flowchart of one embodiment of the client Application Programming Interface (API client) and server data transfers/processings for an API open call from the client node to the server node in accordance with the present invention.

As shown in FIG. 12, processing begins by the client program calling the API "open function" to start the server and mount a tape 310, which in actuality comprises two API functions. In particular, API "allocate" will start the server if it has not been started and will mount the tape, while API "open" will open the tape for writing of data thereto. One embodiment of this combined API "open function" is depicted in FIG. 13. Initially, the API client determines whether the server is running 500. If "no", then the server is started 510 and connection between the client and server is confirmed 520 & 530. If the server is already running, then the API client proceeds to send an open command 540 to the server. The open command is received at the server 550 and tape storage is mounted and opened 550. Results of this process are then returned 570 to the API client which reads the results 580. Upon confirming the opening of the tape storage, the API client returns to point of call 590.

Returning to FIG. 12, after starting the server and mounting the tape, the client program calls the API write function to write a tape label 320, after which inquiry is made whether there are more blocks of data to be written 330. If "yes", then the API write function is called to write the first/next block of data to the tape 340. After writing to the tape, processing inquires whether the tape is full 360. If the tape is not full and there are more blocks of data to be written, then the client program continues in a loop to call the API write function and sequentially write the multiple blocks of data to the tape. Once there are no more blocks, then the API close function is called to close and unmount the tape 350.

Figure 14:
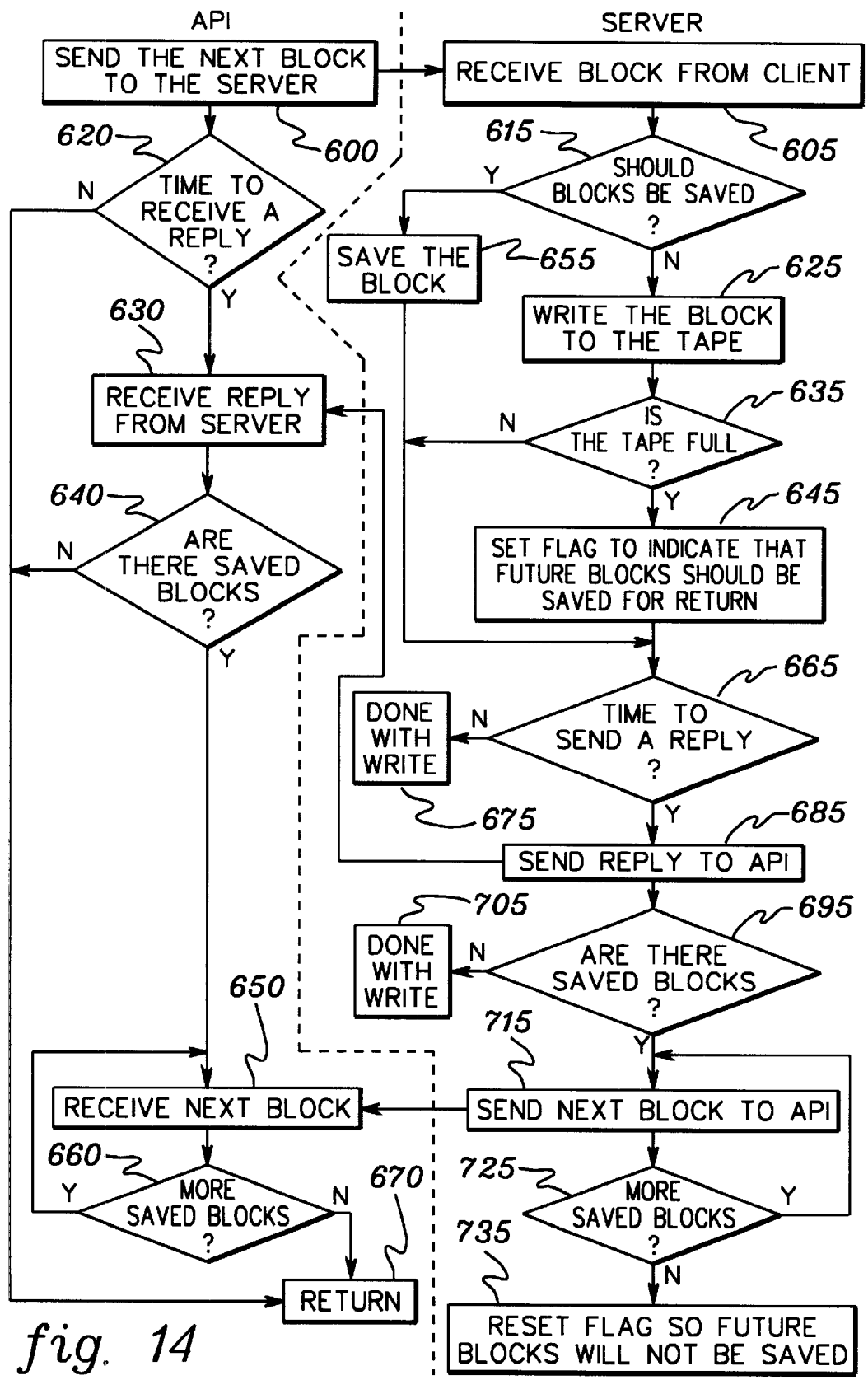
FIG. 14 is a flowchart of one embodiment of an API write call by the client node to the server node in accordance with the present invention.

FIG. 14 presents one embodiment of API and server write processing. The API write command sends a first/next block of data to the server 600. The block of data is received at the server from the client 605 and the server program determines whether the data block should be saved 615. Data blocks should be saved if they cannot currently be written to tape. If "no", then the block of data is written to the tape 625, after which the server determines whether the tape is full 635. If the tape is full, then a flag is set to indicate that all future received blocks of data should be saved for return 645. Once the flag is set, processing proceeds (from inquiry 615) to save the block of data 655.

The server process next determines whether it is time to send a reply to the API client 665. If "no", then the write process is complete 675. Otherwise, a reply is sent to the API client 685. Returning to the API client, after sending a block of data, the API client determines whether it is time to receive a reply 620. If "no", then the process returns to point of call 670. Assuming that a reply is to be received, then the API client receives the reply from the server 630.

At the server, after sending the reply, the server determines whether there are blocks of data saved that need to be returned to the API client 695. If "no", processing is complete 705. In parallel, the API client is determining whether there are saved blocks at the server which need to be returned to the client 640. If there are blocks saved at the server that are to be returned to the client, then a first/next block is sent from the server to the API client 715. The server then determines whether there are additional saved blocks of data 725 and if "yes", the server continues in the loop until all data blocks have been sent. In parallel, the API client receives the first/next block 650 from the server and inquires whether there are additional data blocks saved at the server 660. If "yes", the API client continues in a receive loop until all data blocks have been received, after which return is made to the point of call 670. At the server, once all data blocks have been forwarded to the API client, the save flag is reset so that future blocks of data will be written to tape 735.

Figure 17:
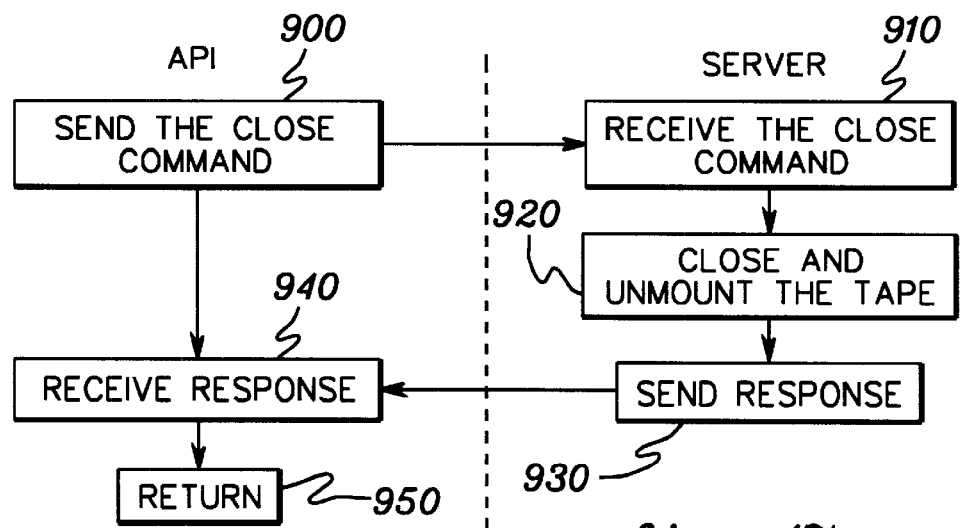
FIG. 17 is a flowchart of one embodiment of an API close call by the client node to the server node in accordance with the present invention.

One embodiment of the API "close function" is depicted in FIG. 17. This "close function" comprises two actual API functions, namely, "close" which closes the tape to further writing of data, and "unallocate" which unmounts the tape. As shown, a command to close 900 is sent from the client API to the server node which receives the close command 910 and closes the file, which may, for example, include unmounting the tape if magnetic tape storage is employed 920. Confirmation of the closing of the file is then sent 930 from the server program back to the API client which receives the response 940, and thereafter returns to point of call 950.

Figure 15:
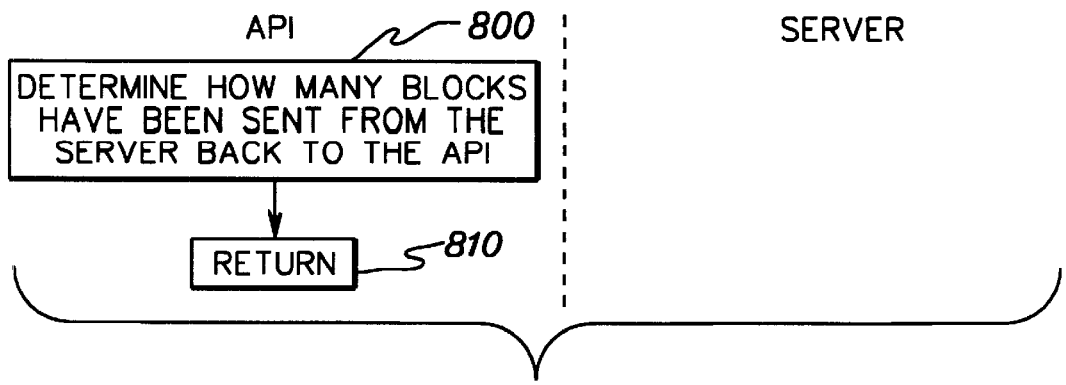
FIG. 15 is a flowchart of one embodiment of a "Query-WriteBuffer" API call by the client node to the server nod in accordance with the present invention.

Returning to FIG. 12, assuming that a physical end of tape is reached without writing all blocks of data to the tape, then processing calls an API "QuerywriteBuffer" function to find out how many blocks have been sent back from the server program to the client program 370. Again, the blocks of data returned to the client program are held in a write-behind buffer. The API "QueryWriteBuffer" function is a new interface call in accordance with the present invention which allows, for example, the client program to determine how many blocks have been written to each tape, and to write header information at the start of each tape as described below. With the server write-behind feature enabled, applications can use the "QueryWriteBuffer" interface call to query the number of remaining write-behind buffers which didn't get written to the current tape when the tape server encounters an end of tape situation. Applications can calculate the number of blocks written to the current tape using the following formula:

actual number of data blocks written to the current tape = cumulated number of data blocks written since opening the current tape − return value of the "Query WriteBuffer" interface call FIG. 15 presents one embodiment of the API "QueryWriteBuffer" function process. Again, this process is called after reaching the physical end of tape of a first storage medium, where blocks of data have been returned to the client node and are currently being held in the write-behind buffer. The client API determines how many blocks have been sent from the server to the client using one or more conventional counters or count mechanisms. After determining the number of data blocks, the process returns 810 to point of call.

Subsequent to determining how many blocks of data have been returned to the client program, the client process calls the API close function to close and unmount the current tape 380. The API close function could be implemented as depicted in FIG. 17, and described above.

Continuing with FIG. 12, after closing the current tape, the API open function is called by the client process 390. If desired, a new server program can be started on a new processor of the distributed processing system, where a new tape is mounted for receiving blocks of data from the client program. Note that the same process described herein can be used to switch between any number of additional tapes and the claims presented are intended to encompass any such implementation. The switching to a new processor, i.e., a new server node, is optional and based upon the amount of tape storage available at the first server node. Assuming that the first server node has multiple tapes, then as noted, switching can occur between tapes without changing the server node.

Figure 16:
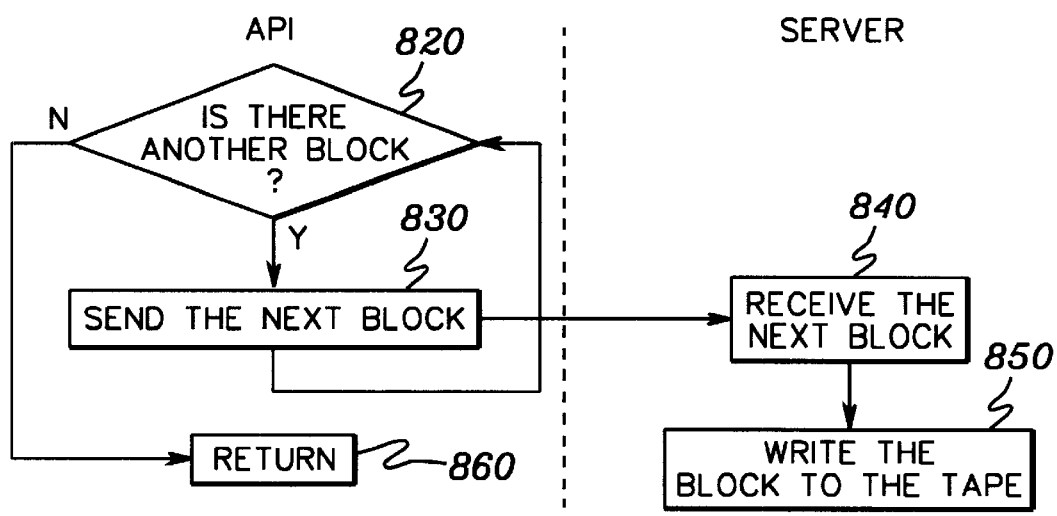
FIG. 16 is a flowchart of one embodiment of a "Flush-WriteBuffer" API call by the client node to the server node in accordance with the present invention.

After writing a label to the new tape, the API client calls the "FlushWriteBuffer" function to send the unwritten blocks (that were received into the write-behind buffer from the first server process) to the current server where they will be written to the new tape 410. FIG. 16 depicts one embodiment of the "FlushWriteBuffer" function. As shown, the API client initially determines whether there is a block of data in the return buffer 820. If so, then the next block of data is forwarded 830 to the new server process where it is received 840. The received block of data is written to the new tape 850. After all blocks of data have been written to the new tape, return is made to point of call 860. After completing the API "FlushWriteBuffer" function, processing (of FIG. 12) returns to inquire whether there are any more blocks to write to tape 330.

As noted, the "QuerywriteBuffer" and "FlushwriteBuffer" functions allow a calling program to determine how many blocks have been written to each tape, and to write returned data blocks to a new tape after switching tapes. If an application needs to write its own header information at the beginning of a tape volume, it can define the configurable options within the tape client configuration file as:

| client.wbh | yes |
| client.flush | no |

If the "client.flush" option is set to "no", the tape server will not write the remaining write-behind buffers to the beginning of the next tape volume until the application calls the "FlushWriteBuffer" function. With the new "FlushWriteBuffer" interface call, after the volume switch event has occurred, the application can write its own header information to the beginning of the tape and then invoke the "FlushWriteBuffer" interface call to write the remaining write-behind buffers before continuing with the normal write operation. If the "QueryWriteBuffer" call is successful, the call returns the number of blocks of data in the write-behind buffers of the device. Otherwise, it returns an error condition. To use the "FlushwriteBuffer" function, the tape server write-behind feature must be enabled without automatic buffer flushing. This can be done by specifying the following key words in the tape client configuration file:

| client.wbh | yes |
| client.flush | no |

If the call is successful, the value "0" is returned. Otherwise, an error condition code is generated.

The present invention can be included, for example, in an article of manufacture (e.g., one or more computer program products) having, for instance, computer usable media,. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An article of manufacture, comprising:

at least one computer usable medium having computer readable program code means embodied therein for storing data in a distributed processing system having multiple processors, one processor being a client node and one or more other processors each being a server node, each server node having at least one storage tape associated therewith, the computer readable program code means in the article of manufacture comprising:

(i) computer readable program code means for causing a computer to write blocks of data from a client process of the client node to a first storage tape of a first server node, said writing continuing until all blocks of data to be stored by said client process are written to said first storage tape or a physical end of storage is reached for the first storage tape, wherein said physical end of storage is reached without size of said first storage tape having been predetermined;

(ii) computer readable program code means for causing a computer to switch writing blocks of data from said client node to a second storage tape of a second server node if the physical end of storage is reached for the first storage tape, wherein the switching writing is transparent to the client process; and (iii) wherein the writing of blocks of data from the client process of the client node to the first storage medium and to the second storage medium comprises a write-behind operation which may fail, wherein said failure is transparent to the client process due to said transparent switching writing from the first storage tape to the second storage tape, and wherein said first server node and said second server node periodically notify the client node whether previously received blocks of data have been correctly written to the first storage tape or the second storage tape, respectively.

2. The article of manufacture of claim 1, wherein said computer readable program code means for causing a computer to switch writing blocks of data to said second storage tape of said second server node occurs without loss of blocks of data to be stored by said client process of the client node, and wherein said method further comprises computer readable program code means for causing a computer to detect said physical end of storage of said first storage tape when writing blocks of data thereto, and computer readable program code means for causing a computer to buffer at the first server node unwritten blocks of data received subsequent to said detecting said physical end of storage for return to said client node.

3. The article of manufacture of claim 1, wherein said client node further comprises an application programming interface (API) for coordinating data transfers between said client process and said first server node and said client process and said second server node, and wherein said computer readable program code means for causing a computer to write blocks of data from said client process comprises computer readable program code means for causing a computer to make an API write call to write said blocks of data from said client process to one of said first storage tape and said second storage tape.

4. The article of manufacture of claim 1, further comprising computer readable program code means for causing a computer to write labels to said first storage tape and said second storage tape in association with said writing blocks of data from said client process to said first storage tape and said second storage tape, said labels identifying said blocks of data written to said first storage tape and said second storage tape.

5. The article of manufacture of claim 1, wherein said computer readable program code means for causing a computer to write blocks of data from said client process to said first storage tape of said first server node comprises, for each block of data, computer readable program code means for causing a computer to initially determine at said first server node whether said block of data should be buffered as comprising a block of data received after said first storage tape has reached said physical end of storage, said computer readable program code means for causing a computer to initially determine comprising computer readable program code means for causing a computer to check status of an end of storage flag maintained at said first server node.

6. The article of manufacture of claim 5, wherein said computer readable program code means for causing a computer to write blocks of data from said client process of the client node to said first storage tape of the first server node comprises, for each block of data, computer readable program code means for causing a computer to determine after writing said block of data to said first storage tape whether said first storage tape is full, and if full, setting said end of storage flag to direct that subsequent blocks of data should be buffered at said first server node for return to said client node.

7. The article of manufacture of claim 1, wherein said client node further comprises an application programming interface (API) for coordinating data transfers between said client process and said first server node and said second server node, and wherein said article of manufacture further comprises computer readable program code means for causing a computer to ascertain for said client process how many blocks of data are written to said first storage tape and how many blocks of data are written to said second storage tape, said computer readable program code means for causing a computer to ascertain comprising computer readable program code means for causing a computer to employ an API "QueryWriteBuffer" call to determine how many unwritten blocks of data were returned from said first server node to said client node after reaching said physical end of storage of said first storage tape.

8. The article of manufacture of claim 1, wherein said computer readable program code means for causing a computer to switch writing blocks of data to said second magnetic tape comprises at least some of computer readable program code means for causing a computer to close connection with said first server node, computer readable program code means for causing a computer to establish connection with said second server node, computer readable program code means for causing a computer to initiate said second server node, and computer readable program code means for causing a computer to mount said second storage tape at said second server node.

9. The article of manufacture of claim 1, further comprising computer readable program code means for causing a computer to write a label to said second storage tape prior to writing blocks of data from said client process of the client node to said second storage tape.

10. An article of manufacture, comprising:
at least one computer usable tape having computer readable program code means embodied therein for storing data in a distributed processing system having multiple processors, one processor comprising a client node and one or more other processors each comprising a server node, each server node having at least one storage tape associated therewith, the computer readable program code means in the article of manufacture comprising:
   (i) computer readable program code means for causing a computer to write blocks of data from a client process of the client node to a first storage tape of the at least one storage tape associated with a first server node, said writing continuing until a physical end of the first storage tape is reached, wherein said physical end of said first storage tape is reached without having predetermined a size of said first storage tape;
   (ii) computer readable program code means for causing a computer to switch said writing of blocks of data to a second storage tape after said physical end of said first storage tape is reached, said second storage tape comprising one storage tape of said at least one storage tape associated with said first server node or one storage tape of said at least one storage tape associated with a second server node of the distributed processing system;
   (iii) wherein said writing of blocks of data to said first storage tape comprises a write-behind operation which may fail, and wherein said first server node periodically notifies said client node whether previously received blocks of data have been written correctly to the first storage tape; and
   (iv) computer readable program code means for causing a computer to ascertain for said client process of said client node how many blocks of data were written to said first storage tape.

11. The article of manufacture of claim 10, wherein said computer readable program code means for causing a computer to write blocks of data to said second storage tape comprises a write-behind operation, and wherein said computer readable program code means for causing a computer to ascertain further comprises computer readable program code means for causing a computer to ascertain for said client process how many blocks of data were written to said second storage tape.

12. The article of manufacture of claim 10, wherein said second storage tape comprises one storage tape of said at least one storage tape associated with said second server node, and wherein said computer readable program code means for causing a computer to switch said writing of blocks of data to said second storage tape comprises computer readable program code means for causing a computer to accomplish said switching without loss of blocks of data from said client process of the client node.

13. The article of manufacture of claim 10, further comprising computer readable program code means for causing a computer to write a header label to said second storage tape prior to said writing of blocks of data from said client process of the client node to said second storage tape.

14. An article of manufacture, comprising:
   at least one computer usable medium having computer readable program code means embodied therein for storing data in a distributed processing system having multiple processors, one processor comprising a client node and one or more other processors each comprising a server node, each server node having at least one storage tape associated therewith, the computer readable program code means in the article of manufacture comprising:
   (i) computer readable program code means for causing a computer to write blocks of data from a client process of the client node to a first storage tape of the at least one storage tape associated with a first server node of the distributed processing system, said writing continuing until a physical end of the first storage tape is reached, wherein said physical end of the first storage tape is reached without having predetermined a size of available storage in the first storage tape;
   (ii) computer readable program code means for causing a computer to write a header label to a second storage tape when said physical end of said first storage tape is reached, said second storage tape comprising one storage tape of said at least one storage tape associated with said first server node or one storage tape of the at least one storage tape associated with a second server node of the distributed processing system;
   (iii) computer readable program code means for causing a computer to switch said writing of blocks of data to said second storage tape when said physical end of said first storage tape is reached, wherein said header label precedes said writing of blocks of data to said second storage tape; and
   (iv) wherein said writing of blocks of data to said first storage tape comprises a write-behind operation which may fail, with said first server node periodically notifying said client node whether previously received blocks of data have been written correctly to the first storage tape.

15. The article of manufacture of claim 14, wherein said computer readable program code means for causing a computer to write said header label to said second storage tape comprises computer readable program code means for causing a computer to control substance of said header label from said client process of said client node.

16. The article of manufacture of claim 14, wherein said computer readable program code means for causing a computer to write blocks of data to said second storage tape comprises a write-behind operation with said second server node periodically notifying said client node whether previously received blocks of data have been written correctly to said second storage tape, and wherein said switching writing occurs without loss of blocks of data from said client process.

17. The article of manufacture of claim 14, wherein said second storage tape comprises said at least one storage tape associated with said second server node.

18. The article of manufacture of claim 14, further comprising computer readable program code means for causing a computer to repeat said writing of a header label and said switching of said writing of blocks of data for n additional storage tapes, each additional storage tape comprising one storage tape of said at least one storage tape associated with at least one server node of the distributed processing system, wherein said writing of said header label and said switching of said writing of blocks of data occur each time a physical end of a current storage tape receiving said blocks of data is reached, wherein $n \geq 1$.

* * * * *